(12) United States Patent
Kim et al.

(10) Patent No.: US 12,523,399 B2
(45) Date of Patent: Jan. 13, 2026

(54) AIR CONDITIONER

(71) Applicant: SAMSUNG ELECTRONICS CO., LTD., Suwon-si (KR)

(72) Inventors: Munsub Kim, Suwon-si (KR); Hyunwuk Kang, Suwon-si (KR); Jiho Baek, Suwon-si (KR); Hyeongjoon Seo, Suwon-si (KR); Duhan Jung, Suwon-si (KR); Jaewoo Choi, Suwon-si (KR); Junyeong Kim, Suwon-si (KR); Taeryong Seong, Suwon-si (KR); Sunghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 18/124,335

(22) Filed: Mar. 21, 2023

(65) Prior Publication Data
US 2023/0221049 A1 Jul. 13, 2023

Related U.S. Application Data

(63) Continuation of application No. PCT/KR2021/010918, filed on Aug. 18, 2021.

(30) Foreign Application Priority Data

Oct. 15, 2020 (KR) .................. 10-2020-0133609

(51) Int. Cl.
*F25B 41/40* (2021.01)
*F16L 55/02* (2006.01)
*F25B 40/02* (2006.01)

(52) U.S. Cl.
CPC .............. *F25B 41/40* (2021.01); *F16L 55/02* (2013.01); *F25B 40/02* (2013.01); *F25B 2400/075* (2013.01); *F25B 2500/13* (2013.01)

(58) Field of Classification Search
CPC .................. F25B 41/40; F25B 2400/075; F25B 2400/07; F25B 2500/13; F25B 43/006;
(Continued)

(56) References Cited

U.S. PATENT DOCUMENTS 5,294,156 A * 3/1994 Kumazaki ............... F25B 41/40
285/415
6,676,091 B2 1/2004 Hauer
(Continued)

FOREIGN PATENT DOCUMENTS

CN 106066068 A * 11/2016 .............. F25B 41/20
CN 205991238 U 3/2017
(Continued)

OTHER PUBLICATIONS

JP-2004093027-A English Translation (Year: 2004).*
(Continued)

*Primary Examiner* — Frantz F Jules
*Assistant Examiner* — Devon Moore
(74) *Attorney, Agent, or Firm* — STAAS & HALSEY LLP

(57) ABSTRACT

An air conditioner is disclosed. The air conditioner comprises: a compressor for compressing a refrigerant; a discharge pipe for guiding the refrigerant discharged from the compressor; an accumulator for storing the refrigerant flowing into the compressor from an outdoor heat exchanger or an indoor heat exchanger; a suction pipe for guiding the refrigerant discharged from the accumulator to the compressor; a subcooler disposed in a pipe between the outdoor heat exchanger and the indoor heat exchanger so as to secure a degree of subcooling of the refrigerant; an injection pipe for guiding a refrigerant superheated in the subcooler to the
(Continued)

compressor; and a fixing member provided for fixing the discharge pipe, the suction pipe, and the injection pipe together.

17 Claims, 12 Drawing Sheets

(58) Field of Classification Search
CPC ... F16L 55/02; F16L 3/22; F16L 3/221; F16L 3/223; F16L 3/2235; F16L 3/227; F16L 3/222; F16L 3/233
USPC .......................................................... 62/324.6
See application file for complete search history.

(56) References Cited

U.S. PATENT DOCUMENTS

| | | | |
|---|---|---|---|
| 7,707,851 B2 | 5/2010 | Park et al. | |
| 9,797,658 B2 | 10/2017 | Kim et al. | |
| 10,184,706 B2 | 1/2019 | Kil et al. | |
| 10,208,987 B2* | 2/2019 | Ikeda | F25B 49/02 |
| 10,801,741 B2 | 10/2020 | Kim et al. | |
| RE48,660 E | 7/2021 | Kim et al. | |
| 11,802,721 B2* | 10/2023 | Endou | F25B 41/40 |
| 2009/0081940 A1 | 3/2009 | Jang et al. | |
| 2015/0192310 A1 | 7/2015 | Mehta et al. | |
| 2019/0078795 A1* | 3/2019 | Kim | F24F 1/28 |
| 2021/0254882 A1* | 8/2021 | Chitrala | F25D 23/006 |

FOREIGN PATENT DOCUMENTS

| | | | | |
|---|---|---|---|---|
| JP | 2004093027 A * | 3/2004 | ............... | F25B 30/02 |
| JP | 2006-125699 | 5/2006 | | |
| JP | 4588881 | 12/2010 | | |
| JP | 2014-159917 | 9/2014 | | |
| JP | 2015-86982 | 5/2015 | | |
| JP | 2015-114002 | 6/2015 | | |
| JP | 6294065 | 3/2018 | | |
| KR | 20-2000-0004684 | 3/2000 | | |
| KR | 10-2007-0090365 | 9/2007 | | |
| KR | 10-2008-0034551 | 4/2008 | | |
| KR | 10-2009-0012840 | 2/2009 | | |
| KR | 10-2009-0028064 | 3/2009 | | |
| KR | 20100070706 A * | 6/2010 | ............... | F24F 5/00 |
| KR | 10-2015-0031578 | 3/2015 | | |
| KR | 10-1525846 | 6/2015 | | |
| KR | 10-2016-0005528 | 1/2016 | | |
| KR | 10-2016-0050292 | 5/2016 | | |
| KR | 10-2017-0047629 | 5/2017 | | |

OTHER PUBLICATIONS

CN-106066068-A English Translation (Year: 2016).*
KR-20100070706-A English Translation (Year: 2010).*
International Search Report dated Dec. 14, 2021 issued in PCT Application No. PCT/KR2021/010918.
Written Opinion dated Dec. 14, 2021 issued in PCT Application No. PCT/KR2021/010918.

* cited by examiner

AIR CONDITIONER

CROSS REFERENCE TO RELATED APPLICATIONS

This application is a continuation application, under 35 U.S.C. § 111(a), of International Patent Application No. PCT/KR2021/010918, filed on Aug. 18, 2021, which claims the priority benefit of Korean Patent Application No. 10-2020-0133609, filed on Oct. 15, 2020 in the Korean Patent and Trademark Office, the disclosures of which are hereby incorporated by reference in their entirety.

BACKGROUND

Field

The disclosure relates to an air conditioner, and more specifically, to an improvement in a piping structure of an air conditioner.

Description of Related Art

In general, an air conditioner includes one outdoor unit installed in an outdoor space and a plurality of indoor units installed in a plurality of indoor spaces, and cools or heats the plurality of indoor spaces by distributing refrigerant to the plurality of indoor units through the one outdoor unit.

The outdoor unit includes a compressor that compresses a refrigerant, an outdoor heat exchanger that exchanges heat with outdoor air, an outdoor expansion valve that, before the refrigerant flows into the outdoor heat exchanger during heating, decompresses and expands the refrigerant, and a four-way valve that guides the refrigerant discharged from the compressor to one of the indoor unit and the outdoor heat exchanger, and each of the indoor units includes an indoor heat exchanger that exchanges heat with indoor air and an indoor expansion valve that, before a refrigerant flows into the indoor heat exchanger during cooling, decompresses and expands the refrigerant, to selectively switch between a cooling operation and a heating operation.

SUMMARY

An air conditioner according to an aspect of the disclosure includes: a compressor configured to compress a refrigerant; a discharge pipe connected to the compressor and configured to guide the compressed refrigerant discharged from the compressor; an accumulator connected to a compressor and configured to store a refrigerant flowing from a heat exchanger into the compressor; a suction pipe connected to the accumulator and configured to guide the refrigerant discharged from the accumulator to the compressor; a sub-cooler disposed between the heat exchanger and the accumulator and configured to secure a degree of supercooling of the refrigerant; an injection pipe connected to the subcooler and configured to guide the refrigerant superheated in the subcooler to the compressor; and a fixing member provided to fix the discharge pipe, the suction pipe, and the injection pipe together.

The fixing member may be a first fixing member, and the air conditioner may include at least one second fixing member to fix the suction pipe and the injection pipe together at a position different from a position of the first fixing member.

The discharge pipe, the suction pipe, and the injection pipe may extend in parallel with each other in an area in which the discharge pipe, the suction pipe, and the injection pipe are fixed by the first fixing member.

The first fixing member may include: a main body including a main hole for fixing the suction pipe; a first sub-body having a first sub-hole for fixing the discharge pipe; and a second sub-body having a second sub-hole for fixing the injection pipe.

The first sub-body and the second sub-body may protrude from the main body in a direction perpendicular to a direction in which the main body extends.

The first fixing member may further include a reinforcement portion formed in an area in which a height of the first sub-body in the extending direction of the main body may overlap a height of the second sub-body in the extending direction of the main body.

The first fixing member may further include a plurality of insertion slits defined in the extending direction of the main body such that the suction pipe, the discharge pipe, and the injection pipe may be seated in the main hole, the first sub-hole, and the second sub-hole, respectively.

The compressor may be a first compressor, and the air conditioner may further include a second compressor, wherein the suction pipe may include a first suction pipe extending from a lower end of the accumulator, and a second suction pipe and a third suction pipe divided from the first suction pipe.

The second suction pipe and the third suction pipe may individually extend in an upper to lower direction along a side surface of the accumulator, and wherein the second suction pipe and the third suction pipe may be bent at a position higher than an upper end of the first compressor or an upper end of the second compressor and are connected to a first suction port formed on the upper end of the first compressor and a second suction port formed on the upper end of the second compressor, respectively.

The air conditioner may include a buffer member formed of an elastically deformable material and having a first support hole and a second support hole in which the second suction pipe and the third suction pipe are inserted and supported, respectively, and a buffer bracket fixed to the accumulator by supporting an outer surface of the buffer member.

The buffer member may include a plurality of cutouts that allow the second suction pipe and the third suction pipe to be inserted into the first support hole and the second support hole, respectively.

A branch point at which the second suction pipe and the third suction pipe may be divided from the first suction pipe may be provided at a position spaced apart from a side surface of the accumulator.

The air conditioner may further include a Y branch pipe connecting the first suction pipe, the second suction pipe, and the third suction pipe to each other, and the Y branch pipe may be disposed on the branch point.

An air conditioner according to an aspect of the disclosure includes: a plurality of compressors; an accumulator configured to prevent a refrigerant in a gas state from being introduced into the plurality of compressors; a suction pipe connecting the accumulator to the plurality of compressors, the suction pipe including a main suction pipe extending from a lower end of the accumulator as one pipe, and a plurality of sub-suction pipes divided from the main suction pipe and connected to the plurality of compressors, respectively; a buffer member formed of an elastically deformable material and provided at an inside thereof with a plurality of support holes in which the plurality of sub-suction pipes are inserted and supported; and a buffer bracket fixed to the accumulator while supporting an outer surface of the buffer member.

The plurality of sub-suction pipes may extend in an upper to lower direction along a side surface of the accumulator, and the plurality of suction pipes may be bent at a position higher than an upper end of the plurality of compressors to be connected to suction ports formed on the upper ends of the plurality of compressors, respectively.

A branch point at which the plurality of sub-suction pipes may be divided from the pipe extending from the lower end of the accumulator may be provided at a position spaced apart from a side surface of the accumulator.

The air conditioner may further include: a plurality of discharge pipes configured to guide the refrigerant discharged from the plurality of compressors; a subcooler disposed in a pipe between the heat exchanger and the accumulator and securing a degree of supercooling of the refrigerant; a plurality of injection pipes branching from a pipe between the accumulator and the subcooler and connected to the plurality of compressors, respectively; and a first fixing member provided to fix one of the plurality of discharge pipes, one of the plurality of sub-suction pipes, and one of the plurality of injection pipes together.

The air conditioner may include at least one second fixing member provided to fix the one of the plurality of discharge pipes and the one of the plurality of injection pipes together at a position different from a position of the first fixing member.

The one of the plurality of discharge pipes, the one of the plurality of the suction pipes, and the one of the plurality of injection pipes may extend in parallel with each other in an area in which the one of the plurality of discharge pipes, the one of the plurality of the suction pipes, and the one of the plurality of injection pipes are fixed by the first fixing member.

The plurality of compressors may be provided as two compressors, and the plurality of sub-suction pipes may be provided as two sub-suction pipes.

According to an aspect of the disclosure, the air conditioner is provided such that a main suction pipe extending from one accumulator is divided into two sub-suction pipes, respectively delivering refrigerants to two compressors, so that the structure of suction pipes connecting the accumulator and the plurality of compressors can be simplified.

According to an aspect of the disclosure, the air conditioner is provided such that two sub-suction pipes respectively delivering refrigerants to two compressors are fixed to a sidewall of an accumulator by a fixing member, so that pipe vibration can be effectively attenuated.

According to an aspect of the disclosure, the air conditioner is provided with a fixing member for fixing a discharge pipe, an suction pipe, and an injection pipe connected to a compressor together, so that vibration displacements of each of the pipes can be integrated, thereby reducing a resonance region while reducing the amplitude of the resonance band.

DETAILED DESCRIPTION

Figure 1:
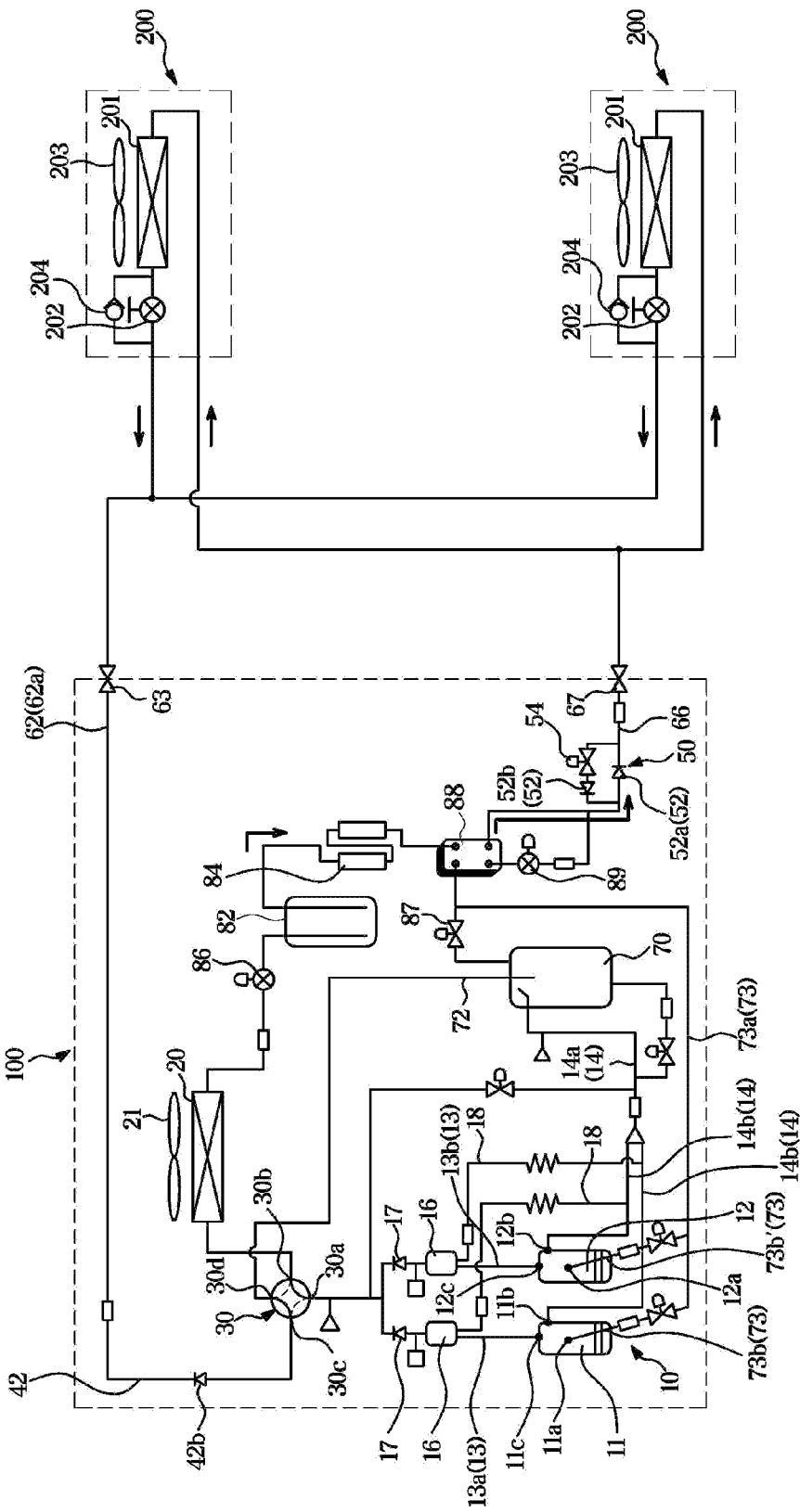
FIG. 1 is a schematic view illustrating an air conditioner according to the disclosure.

Embodiments described in the specification and configurations shown in the accompanying drawings are merely exemplary examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein are only for the purpose of describing particular embodiments and are not intended to limit to the present disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the present disclosure. The term "and/or" includes combinations of one or all of a plurality of associated listed items.

The terms "front", "rear", "upper", "lower", "top", and "bottom" as herein used are defined with respect to the drawings, but the terms may not restrict the shape and position of the respective components.

The term "connected" includes not only the case of being directly connected, but also the word being indirectly connected by a third element.

In addition, a fan described below is illustrated as being applied to a ceiling-type air conditioner, but may also be applied to other types of air conditioners, such as a stand-type air conditioner or a wall-mounted air conditioner, and may also be applied to other home appliances, such as a refrigerator or a vacuum cleaner.

One aspect of the disclosure provides an air conditioner capable of simplifying a structure of a suction pipe connecting one accumulator to a plurality of compressors.

Another aspect of the disclosure provides an air conditioner capable of reducing pipe vibration of a plurality of suction pipes connected to a plurality of compressors.

Another aspect of the disclosure provides an air conditioner capable of reducing a resonance region while reducing an amplitude of a resonance band by integrating vibration displacements of various pipes connected to a plurality of compressors.

Hereinafter, embodiments according to the disclosure will be described in detail with reference to the accompanying drawings.

FIG. 1 is a schematic diagram illustrating an air conditioner according to the disclosure.

As shown in FIG. 1, an air conditioner according to an embodiment of the disclosure may include at least one outdoor unit 100 installed in an outdoor space and a plurality of indoor units 200 individually installed in independent indoor spaces, and connected the outdoor unit 100 through pipes to be described below. In the following description, the outdoor unit 100 is illustrated as being provided as one outdoor unit 100.

When the plurality of indoor units 200 are in a cooling operation, an outdoor heat exchanger 20 may serve as a condenser, and when the plurality of indoor units 200 are in a heating operation, the outdoor heat exchanger 20 may serve as an evaporator.

Each of the plurality of indoor units 200 includes an indoor heat exchanger 201 that exchanges heat with indoor air, an indoor expansion valve 202 that, before the refrigerant guided to the indoor heat exchanger 201 is transmitted to the indoor heat exchanger 201 during a cooling operation, allows a refrigerant to be decompressed and expanded, and an indoor blowing fan 203 that allows indoor air to pass through the indoor heat exchanger 201.

The outdoor unit 1 may include a plurality of compressors 10 that compress a refrigerant, an outdoor heat exchanger 20 that exchanges heat with outdoor air, and an outdoor blowing fan 21 that allows outdoor air to pass through the outdoor heat exchanger 20, and may include an outdoor expansion device 50 and a four-way valve 30 that allows a refrigerant discharged from the plurality of compressors 10 to be selectively transferred to one of the outdoor heat exchanger 20 and the indoor heat exchanger 201 to be described below. Alternatively, the compressor 10 may be provided as one compressor instead of a plurality of compressors 10.

However, the following description will be made in relation that the plurality of compressors 11 and 12 (all of the compressors designated by reference number 10) are provided as two compressors, a first compressor 11 and a second compressor 12.

The first compressor 11 and the second compressor 12 may be provided as scroll compressors. The first compressor 11 and the second compressor 12 may be arranged in parallel with each other. Therefore, only one of the first compressor 11 and the second compressor 12 may be driven or both the first compressor 11 and the second compressor 12 may be driven to flexibly respond a cooling load or heating load required by the air conditioner.

The first compressor 11 and the second compressor 12 may have a discharge passage connected to the four-way valve 30, and a suction passage on which an accumulator 70 may be installed.

The accumulator 70 is connected to the first compressor 11 and the second compressor 12 so that a liquid refrigerant is accumulated and a gas refrigerant is suctioned into the first compressor 11 or the second compressor 12.

The accumulator 70 may temporarily store a refrigerant flowing from the outdoor heat exchanger 20 or the indoor heat exchanger 201 into the compressor. Specifically, the accumulator 70 may temporarily store a refrigerant flowing from a side of the outdoor heat exchanger 20 or a side of the plurality of indoor units 200 to a suction side of the plurality of compressors 10. In the accumulator 70, the refrigerant may be separated into a gas refrigerant and a liquid refrigerant. The gas refrigerant separated from the accumulator 70 may be suctioned into low-pressure suction ports 11b and 12b of the plurality of compressors 10. The low-pressure suction ports 11b and 12b may include a first low-pressure suction port 11b formed in the first compressor 11 and a second low-pressure suction port 12b formed in the second compressor 12. The detailed structure of the accumulator 70 and the low-pressure suction ports 11b and 12b of the plurality of compressors 10 will be described below.

Between the first compressor 11 and the second compressor 12 and the accumulator 70, a suction pipe 14 connecting the first compressor 11 and the second compressor 12 to the accumulator 70 may be provided, and between the accumulator 70 and the four-way valve 30, an accumulator suction pipe 72 connecting the accumulator 70 to the four-way valve 30 may be provided.

The discharge passage of the plurality of compressors 10 may have an oil separator 16 for separating a refrigerant from oil, a check valve 17 for preventing a reverse flow of refrigerant, and the four-way valve 30 installed thereon.

The oil separator 16 may be connected with an oil return passage 18 that allows the oil separated from the refrigerant in the oil separator 16 to return to the suction pipe 14 of the compressor.

In the outdoor unit 1, a refrigerant is guided between the outdoor unit 100 or the indoor unit 200 through a gas pipe 60 and a liquid pipe 66. High-pressure gas may be guided through the gas pipe 62. A refrigerant liquid may flow through the liquid pipe 66. In addition, the outdoor unit 100 may be provided with a liquid pipe service valve 67 for adjusting the opening degree of the liquid pipe 66 or for opening and closing the liquid pipe 66. A refrigerant inside the outdoor heat exchanger 20 may have heat exchanged with outdoor air, which serves as a circulating fluid.

The outdoor expansion device 50 may not expand a refrigerant passing therethrough that has passed through the outdoor heat exchanger 20, but may expand a refrigerant passing therethrough that has not passed through the outdoor heat exchanger 20.

The outdoor expansion device 50 may be provided between the outdoor heat exchanger 20 and the indoor heat exchanger 201, and may include an outdoor expansion valve 54 and an outdoor check valve 52. In the embodiment of the disclosure, a refrigerant passage for a refrigerant flowing from the outdoor heat exchanger 20 to the indoor heat exchanger 201 may be provided with an outdoor check valve 52 to prevent a reverse flow, and a refrigerant passage for a refrigerant flowing from a distributor 120 to the outdoor heat exchanger 20 may be provided with an outdoor check valve 52 to prevent a reverse flow and an outdoor expansion valve 54. When the former is referred to as a first outdoor check valve 52a and the latter is referred to as a second outdoor check valve 52b, the first outdoor check valve 52a may be provided in parallel with the second outdoor check valve 52b and the outdoor expansion valve 54. The outdoor expansion valve 54 may be, for example, an electronic expansion valve (EEV).

The four-way valve 30 may be provided on the discharge passage of the plurality of compressors 10. In other words, the four-way valve 30 may be provided on a side of the discharge pipe 13 of the plurality of compressors 10. The four-way valve 30 allows the refrigerant compressed in the plurality of compressors 10 to flow to the outdoor heat exchanger 20 during a cooling operation, and allows the refrigerant passed through the outdoor heat exchanger 20 to flow toward the plurality of compressors 10 during a heating operation.

The four-way valve 30 of the outdoor unit 100 includes a first port 30a connected to the side of the discharge passage of the plurality of compressors 10 through the oil separator 16, and a second port 30b connected to the liquid pipe 66 through the outdoor heat exchanger 20 and the outdoor expansion device 50. In addition, a third port 30c of the four-way valve 30 may communicate with the gas pipe 62 and a fourth port 30d of the four-way valve 30 may be connected to the accumulator 70.

The outdoor unit 100 may further include a reservoir 82, a refrigerant cooler 84, an outdoor heat exchanger valve 86, a subcooler 88, a solenoid valve 87, and an injection pipe 73.

The reservoir 82 may be provided to cope with the difference between the amount of a refrigerant required for cooling and the amount of a refrigerant required for heating, and may be disposed between the outdoor heat exchanger 20 and the subcooler 88, which will be described below, to store a refrigerant in a liquid state during a cooling operation. More specifically, the reservoir 82 may be disposed between the outdoor heat exchanger 20 and the refrigerant cooler 84.

The refrigerant cooler 84 serves as a heat sink for an inverter controller by circulating the refrigerant to dissipate heat from the inverter controller. The outdoor heat exchanger valve may be a component to adjust the amount of a refrigerant flowing into the outdoor heat exchanger 20 and may be provided between the reservoir 82 and the outdoor heat exchanger 20.

The subcooler 88 may secure the degree of supercooling of the refrigerant sent to the plurality of indoor units 200 during a cooling operation, and may be disposed in a pipe between the outdoor heat exchanger and the indoor heat exchanger.

More specifically, the subcooler 88 may be provided between the outdoor heat exchanger 20 and the outdoor expansion device 50, or provided between the refrigerant cooler 84 and the outdoor expansion device 50. The subcooler 88 is a sub-heat exchanger that performs heat exchange between a portion, of a liquid refrigerant discharged from the receiver 82, which is expanded by an electric expansion valve 89, and the remaining liquid refrigerant. The refrigerant expanded while passing through the electric expansion valve 89 absorbs heat while passing through the subcooler 88 to be phase-converted into a gas refrigerant.

The electric expansion valve 89 is an electronic expansion valve (EEV) that expands a portion of the refrigerant flowing into the subcooler 88 from the receiver 82 or a portion of the refrigerant passed through one side of the subcooler 88, which is to flow into the other side of the subcooler 88. The refrigerant expanded by the electric expansion valve 89 flows into the subcooler 88. The subcooler 88 and the electric expansion valve 89 constitute a gas-liquid separator, and are installed in the liquid pipe 66 between the plurality of indoor units 200 and the outdoor heat exchanger 20, and serve to separate a gas refrigerant from a refrigerant flowing from the plurality of indoor units 200 to the outdoor heat exchanger 20 during a heating operation.

The solenoid valve 87 may be connected to a low-pressure pipe between the subcooler 88 and the accumulator 70 and may be opened and closed such that the refrigerant heat-exchanged in the subcooler 88 are introduced to the accumulator 70 or intermediate pressure suction ports 11a and 12a of the plurality of compressors 10. The intermediate pressure suction ports 11a and 12a may include a first intermediate pressure suction port 11a formed in the first compressor 11 and a second intermediate pressure suction port 12a formed in the second compressor 12.

When the solenoid valve 87 is opened, the refrigerant from the subcooler 88 may flow into the accumulator 70 having a relatively low-pressure, and when the solenoid valve 87 is closed, the refrigerant from the subcooler 88 may flow into the injection pipe 73 connected to the intermediate pressure suction ports 11a and 12a of the plurality of compressors 10 having a relatively high pressure.

The injection pipe 73 may be branched from a pipe between the subcooler 88 and the accumulator 70 and connected to the side of the intermediate pressure suction ports 11a and 12a of the plurality of compressors 10. More specifically, the injection pipe 73 may be branched between the solenoid valve 87 and the subcooler 88 and connected to the intermediate pressure suction ports 11a and 12a of the plurality of compressors 10.

Therefore, when the solenoid valve 87 is opened, the refrigerant from the subcooler 88 may not flow into the injection pipe 73 connected to the intermediate pressure suction ports 11a and 12a of the plurality of compressors 10 having a relatively high pressure but may flow into the accumulator 70 having a relatively low-pressure. Meanwhile, when the solenoid valve 87 is closed, the gas refrigerant discharged from the subcooler 88 may flow along the injection pipe 73 and then may be injected to the side of the intermediate pressure suction ports 11a and 12a of the plurality of compressors 10.

The gas refrigerant discharged from the subcooler 88 through the injection pipe 73 may be injected into the side of the intermediate pressure suction ports 11a and 12a of the plurality of compressors 10 to improve the compression efficiency of the compressor.

Figure 2:
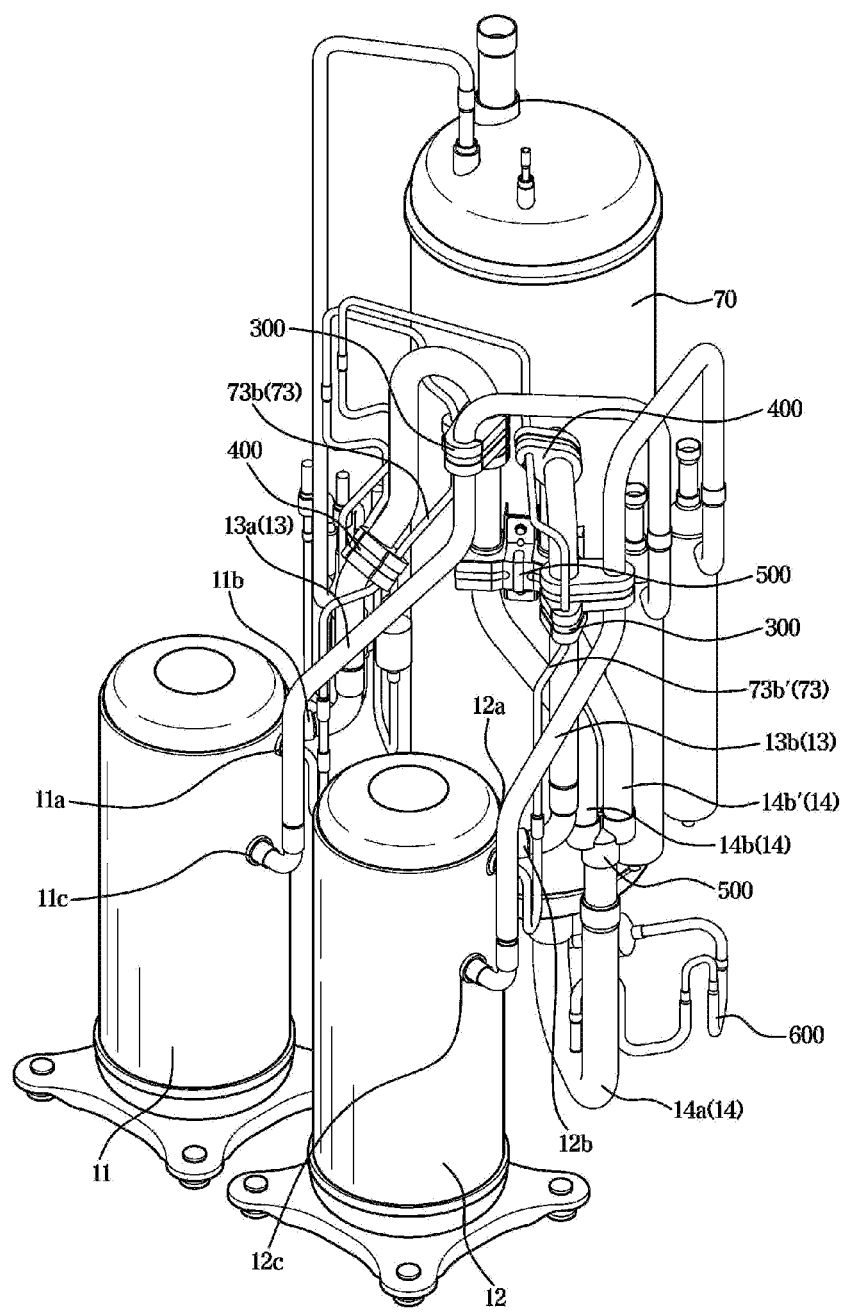
FIG. 2 is a perspective view illustrating an air conditioner according to the disclosure.
Figure 3:
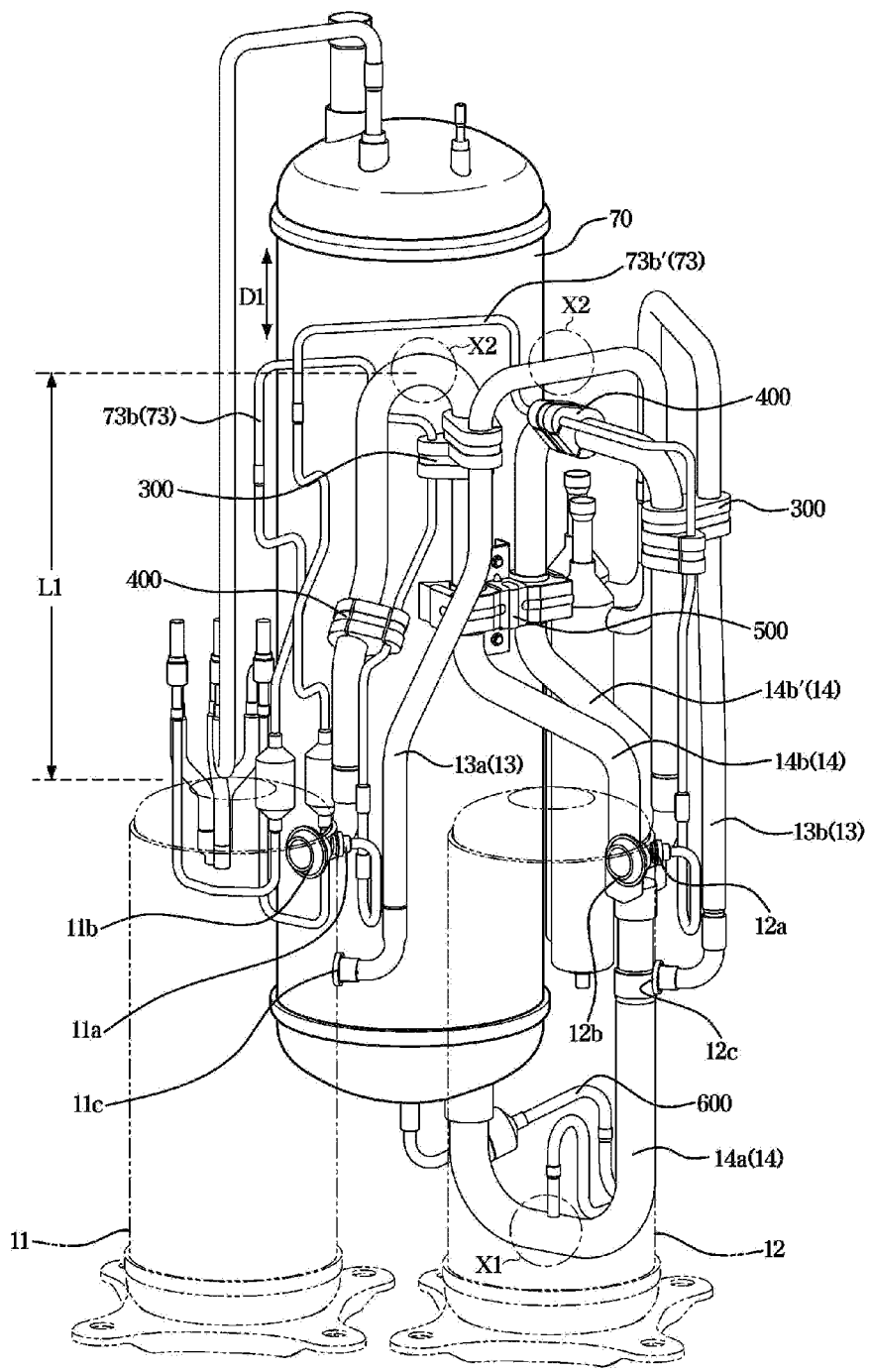
FIG. 3 is a perspective view illustrating the air conditioner shown in FIG. 2, viewed from another side.
Figure 4:
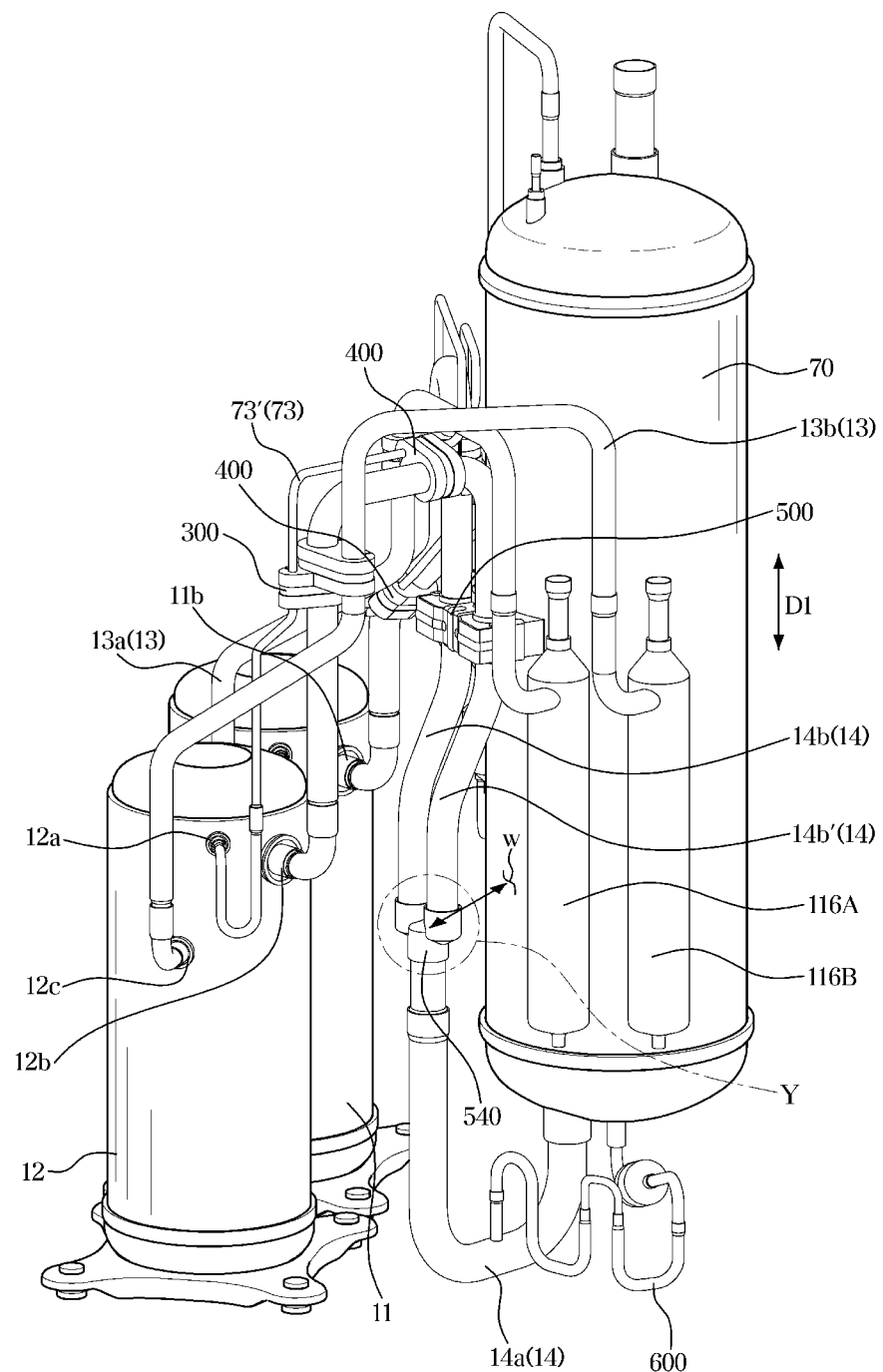
FIG. 4 is a perspective view illustrating the air conditioner shown in FIG. 2, viewed from another side.
Figure 5:
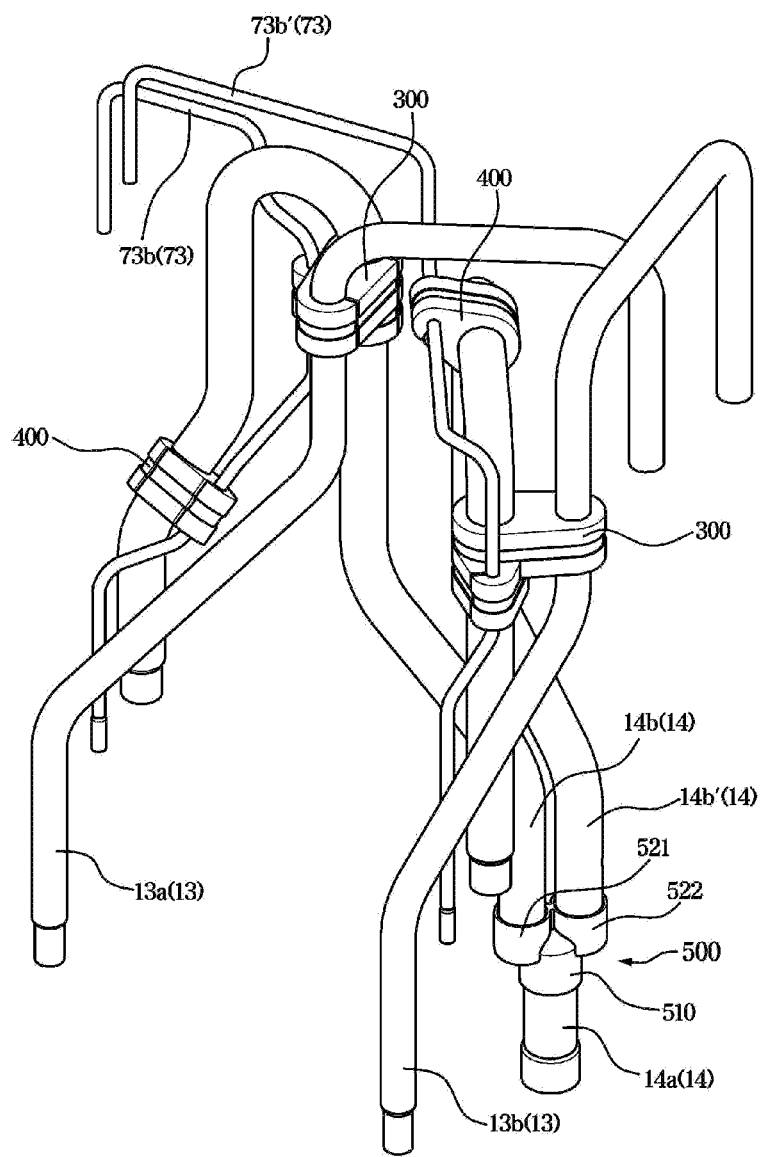
FIG. 5 is a perspective view illustrating a suction pipe, a discharge pipe, and an injection pipe according to the disclosure.
Figure 6:
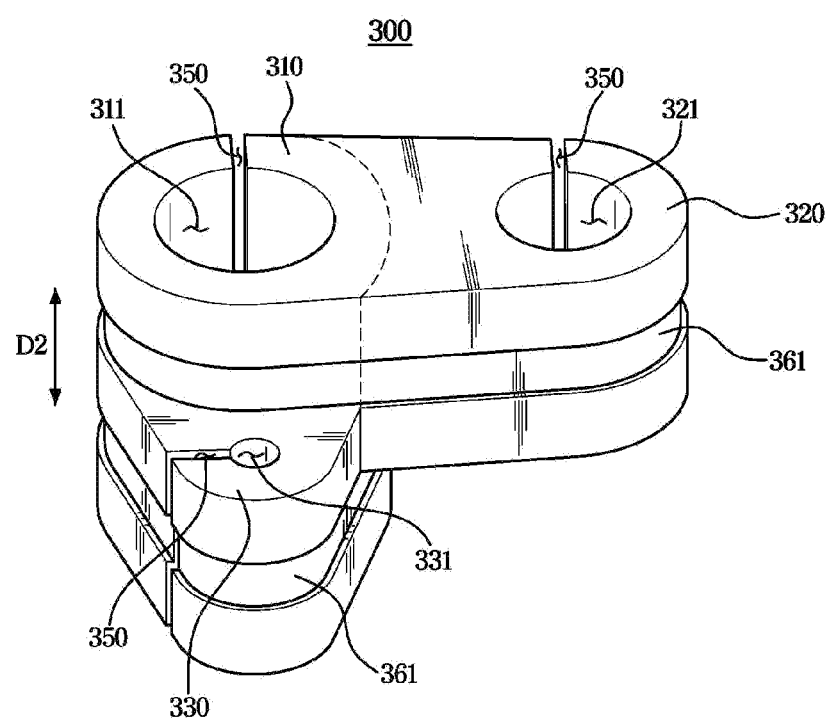
FIG. 6 is a perspective view illustrating a fixing member according to the disclosure.
Figure 7:
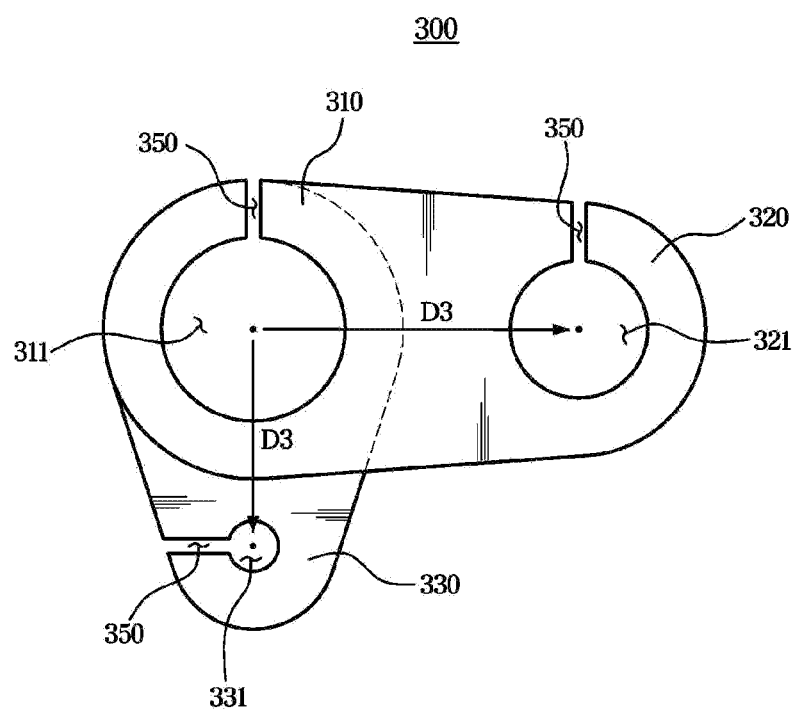
FIG. 7 is a view illustrating an upper surface of a fixing member according to the disclosure.
Figure 8:
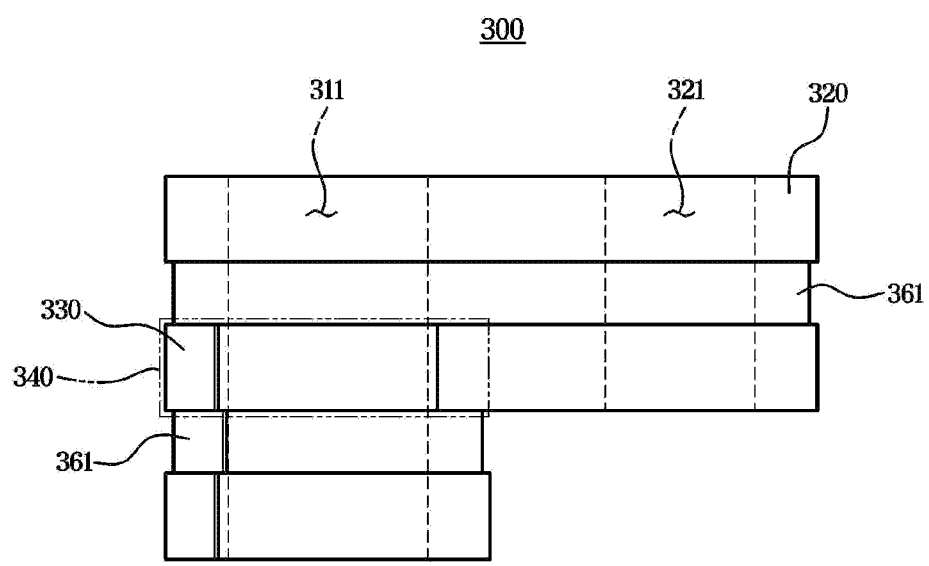
FIG. 8 is a view illustrating a side surface of a fixing member according to the disclosure.
Figure 9:
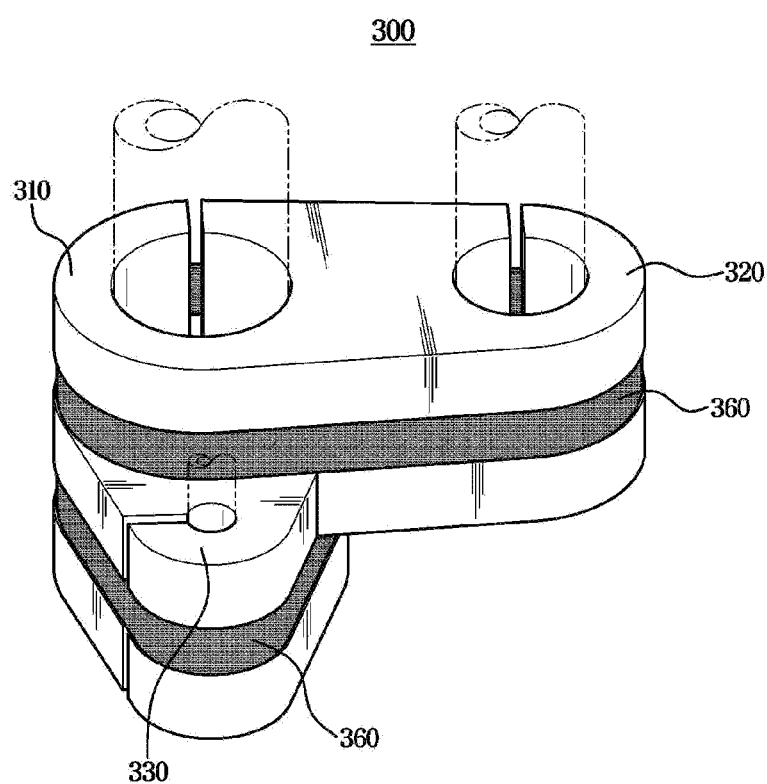
FIG. 9 is a view illustrating a state in which a support cable is mounted on the fixing member shown in FIG. 6.

FIG. 2 is a perspective view illustrating an air conditioner according to the disclosure. FIG. 3 is a perspective view illustrating the air conditioner shown in FIG. 2, which is viewed from another side. FIG. 4 is a perspective view illustrating the air conditioner shown in FIG. 2, which is viewed from another side. FIG. 5 is a perspective view illustrating a suction pipe, a discharge pipe, and an injection pipe according to the disclosure. FIG. 6 is a perspective view illustrating a fixing member according to the disclosure. FIG. 7 is a view illustrating an upper surface of a fixing member according to the disclosure. FIG. 8 is a view illustrating a side surface of a fixing member according to the disclosure.

Referring to FIGS. 2 to 5, a piping structure and a fixing structure between pipes according to the disclosure will be described in detail.

The plurality of compressors 10 may be provided as two compressors, the first compressor 11 and the second compressor 12, as described above. Alternatively, the air conditioner 1 may be provided with one compressor, the first compressor 11, rather than a plurality of compressors 10.

Since the air conditioner 1 according to an embodiment of the disclosure may include a plurality of compressors 10, pipes connected to the plurality of compressors 10 may also be provided in plural. The plurality of pipes may include a plurality of discharge pipes 13, a plurality of suction pipes 14, and a plurality of injection pipes 73.

In the air conditioner 1 according to an embodiment of the disclosure, it is assumed that the first compressor 11 and the second compressor 120 or the pipes respectively connected to the first compressor 11 and the second compressor 12 have structures correspond to each other.

Therefore, the following description concerns the structural relationship between the first compressor 11 and other components of the air conditioner 1 with respect to the first compressor, and the description related to the second compressor 12 will be omitted when it overlaps that of the first compressor 11. Therefore, a first discharge pipe 13a for the discharge pipe 13, a second suction pipe 14b for the suction pipe 14, and a first sub-injection pipe 73b for the injection pipe 73 will be described.

The air conditioner 1 according to the embodiment of the disclosure may include a plurality of discharge pipes 13. The plurality of discharge pipes 13 may include a first discharge pipe 13a connected to the first compressor 11 and a second discharge pipe 13b connected to the second compressor 12. Hereinafter, "a discharge pipe" other than 'a plurality of discharge pipes' may be used as a term referring to the first discharge pipe 13a.

Referring to FIG. 4, the suction pipe 14 may include one main suction pipe 14a and a plurality of sub-suction pipes 14b divided from the one main suction pipe 14a. The plurality of sub-suction pipes 14b and 14b' may include a first sub-suction pipe 14b connected to the first compressor 11 and a second sub-suction pipe 14b' connected to the second compressor 12.

Hereinafter, a first suction pipe 14a may be used as a term referring to the one main suction pipe 14a, a second suction pipe 14b may be used as a term referring to the first sub-suction pipe 14b, and a third suction pipe 14b' may be used as a term referring to the second sub-suction pipe 14b'.

By not using a suction pipe structure extending from the accumulator 70 into two pipes that are then connected to the first compressor 11 or the second compressor 12, but using a suction piping structure including a plurality of sub-suction pipes 14b and 14' divided from one main suction pipe 14a, the pipe structure may be simplified. In addition, due to the simplified pipe structure, the vibration reduction effect may be increased, and the length of the pipe provided as the suction pipe may be minimized.

In addition, since the same accumulator structure may be used for an air conditioner using one compressor and an air conditioner using two or more compressors, parts used in the air conditioners may be compatible.

The injection pipe 73, similar to the suction pipe 14, may also include one main injection pipe 73a and a plurality of sub-injection pipes 73b and 73b' divided from the one main injection pipe 73a. The plurality of sub-injection pipes 73b and 73b' may include a first sub-injection pipe 73b connected to the first compressor 11 and a second sub-injection pipe 73b' connected to the second compressor 12.

The first compressor 11 of the air conditioner 1 according to the embodiment of the disclosure may include the intermediate pressure suction port 11a, the low-pressure suction port 11b, and the discharge port 11c. Similarly, the second compressor 12 configured to correspond to the first compressor 11 may also include the intermediate pressure suction port 12a, the low-pressure suction port 12b, and the discharge port 12c. The suction ports and the discharge ports of the first compressor 11 may be formed at positions corresponding to the suction ports and the discharge ports of the second compressor 12.

The low-pressure suction port 11b may be connected with the suction pipe 14 provided to allow a refrigerant discharged from the accumulator 70 to flow to the first compressor 11. More specifically, the low-pressure suction port 11b may be connected to the second suction pipe 14b provided to allow a refrigerant discharged from the accumulator 70 to flow to the first compressor 11.

The suction pipe 14 may include the first suction pipe 14a extending from the lower end of the accumulator 70, and the second suction pipe 14b and the third suction pipe 14b' divided from the first suction pipe 14a, as described above.

The first suction pipe 14a extending from the lower end of the accumulator 70 toward the lower side of the accumulator 70 may be primarily bent (X1 in FIG. 3) in a U shape, and then extend toward the upper side of the accumulator 70 along the side surface of the accumulator 70 in an upper to lower direction D1.

The first suction pipe 14a, which is primarily bent (X1) and extends in the upper to lower direction D1 toward the upper side of the accumulator 70 along the side surface of the accumulator 70, may be divided into the second suction pipe 14b and the third suction pipe 14b' at a certain point. A branch point Y at which the second suction pipe 14b and the third suction pipe 14b' are divided from the first suction pipe 14a into two branches may be provided at a position spaced apart from the side surface (W in FIG. 4) of the accumulator 70.

On the branch point Y at which the second suction pipe 14b and the third suction pipe 14b' are divided into two branches from the first suction pipe 14a, a Y branch pipe 540 interconnecting the second suction pipe 14b, the third suction pipe 14b', and the first suction pipe 14a to each other may be disposed.

Referring to FIG. 5, the Y branch pipe 540 may include a first connection portion 510 connected to the first suction pipe 14a, a second connection portion 521 connected to the second suction pipe 14b, and a third connection portion 500 connected to the third suction pipe 14b'.

The second suction pipe 14b and the third suction pipe 14b' may each extend in the upper to lower direction D1 along the side surface W of the accumulator 70. The second suction pipe 14b and the third suction pipe 14b' may extend upward along the side surface W of the accumulator 70 and may be fixed to the side surface W of the accumulator 70 by a third fixing member 500, which will be described below, between a secondary bent point X2 and the branch point Y at which the second suction pipe 14b and the third suction pipe 14b' are divided from the first suction pipe 14a into two branches. A detailed structure in which the second suction pipe 14b and the third suction pipe 14b' are fixed to the side surface W of the accumulator 70 by the third fixing member 500 will be described below.

The second suction pipe 14b and the third suction pipe 14b' may be secondarily bent at a position (X2) higher than the upper end of the first compressor 11 or the upper end of the second compressor 12, and connected to the low-pressure suction port 11b formed on the upper end of the first compressor 11 and the low-pressure suction port 12b formed on the upper end of the second compressor 12, respectively. A point (X2) at which the second suction pipe 14b and the third suction pipe 14b' are secondarily bent and the upper end of the first compressor 11 or the second compressor 12 form a predetermined separation distance L1 therebetween.

The predetermined separation distance L1 may be determined according to the specifications of the air conditioner 1.

The second suction pipe 14b extending in the upper to lower direction D1 along the side surface of the accumulator may be secondarily bent in a U shape at the position (X2, in FIG. 3) higher than the upper end of the first compressor 11. The second suction pipe 14b bent secondarily (X2) may be connected to the low-pressure suction port 11b formed on the upper end of the first compressor 11.

Hereinafter, the low-pressure suction port 11b formed on the upper end of the first compressor 11 may be referred to as a first suction port 11b, and the low-pressure suction port 12b formed on the upper end of the second compressor 12 may be referred to as a second suction port 12b.

The intermediate pressure suction port 11a may be connected with the injection pipe 73 branched from a pipe between the subcooler 88 and the accumulator 70. More specifically, the intermediate pressure suction port 11a may be connected with the first sub-injection pipe 73b branched from a pipe between the subcooler 88 and the accumulator 70.

The injection pipe 73 may be disposed to include a part that extends in parallel with the suction pipe 14 while being adjacent to the suction pipe 14 in an area. The injection pipe 73 may be fixed to the suction pipe 14 by a first fixing member 300 and a second fixing member 400, to be described below, in the area in which the injection pipe 73 is disposed in parallel with the suction pipe 14 adjacent to the suction pipe 14.

The discharge port 11c may be connected with the first discharge pipe 13a for guiding the refrigerant discharged from the compressor.

Hereinafter, the first fixing member 300 and the second fixing member 400 of the air conditioner 1 according to the embodiment of the disclosure will be described with reference to FIGS. 2 to 8.

The first discharge pipe 13a, the suction pipe 14, and the injection pipe 73 connected to the first compressor 11 may have natural frequencies that are different from each other. Therefore, from the structural aspect of the air conditioner 1, resonance regions may be sporadically present in a wide range, which causes difficulty in vibration reduction design. Accordingly, there is a need to reduce the resonance region and the resonance band amplitude by integrating the vibration displacements of each of the pipes.

Referring to FIGS. 2 to 5, the air conditioner 1 according to the embodiment of the disclosure further includes a fixing member 300 provided to fix the first discharge pipe 13a, the suction pipe 14, and the injection pipe 73 together. More specifically, the fixing member 300 may be provided to fix the first discharge pipe 13a, the second suction pipe 14b, and the first sub-injection pipe 73b together. The fixing member 300 provided to fix the first discharge pipe 13a, the suction pipe 14, and the injection pipe 73 together may be referred to as a first fixing member 300. The fixing member 300 may be formed of an elastic material.

Referring to FIGS. 5 to 8, the first discharge pipe 13a, the suction pipe 14, and the injection pipe 73 may be provided to have respective extending directions that are in parallel with each other in an area in which the first discharge pipe 13a, the suction pipe 14, and the injection pipe 73 are fixed by the first fixing member 300.

The first fixing member 300 may include a main body 310 including a main hole 311 for fixing the second suction pipe 14b, a first sub-body 320 including a first sub-hole 321 for fixing the first discharge pipe 13a, and a second sub-body 330 including a second sub-hole 331 for fixing the first sub-injection pipe 73b.

The diameters of the main hole 311, the first sub-hole 321, and the second sub-hole 331 may be formed to correspond to the diameters of the pipes each of which is inserted into a respective one of the first sub-hole 321, and the second sub-hole 331. Specifically, the diameters of the pipes may be provided to decrease in the order of the second suction pipe 14b, the first discharge pipe 13a, and the first sub-injection pipe 73b. Therefore, the diameters of the holes may decrease in the order of the main hole 311, the first sub-hole 321, and the second sub-hole 331.

The main hole 311 may be formed in the center of the main body 310. The main body 310 may be provided in a substantially cylindrical shape.

The first sub-body 320 and the second sub-body 330 may protrude from the main body 310 in a direction (D3 in FIG. 7) perpendicular to an extending direction D2 of the main body 310. Specifically, the first sub-body 320 and the second sub-body 330 may each protrude from the side surface of the main body 310. Each of the first sub-body 320 and the second sub-body 330 may protrude in a direction perpendicular to the extending direction D2 of the main body 310, but may protrude in different directions from each other.

Specifically, referring to FIG. 7, the protruding directions of the first sub-body 320 and the second sub-body 330 may be substantially perpendicular to each other. The first sub-body 320 and the second sub-body 330 may be arranged in an upper to lower direction based on the extending direction D2 of the main body 310.

The first sub-hole 321 may be formed in the center of the first sub-body 320 protruding from the main body 310. The second sub-hole 331 may be formed in the center of the second sub-body 330 protruding from the main body 310.

The first fixing member 300 may include a reinforcement portion (340, in FIG. 8) formed in an area in which a height of the first sub-body 320 in the extending direction D1 of the main body 310 overlaps a height of the second sub-body 320 in the extending direction D1 of the main body 310. The reinforcing portion 340 may be provided approximately at a half of the height of the main body 310. That is, the reinforcement portion 340 may be provided as a part of the main body 310.

The first fixing member 300 may further include a plurality of insertion slits 350 cut in the extending direction of the main body such that the second suction pipe 14b, the first discharge pipe 13a, and the injection pipe 73b are seated in the main hole 311, the first sub-hole 321, and the second sub-hole 331, respectively.

Each of the plurality of insertion slits 350 may be formed to correspond to the height of the main body 310, the first sub-body 320, or the second sub-body 330. The width of each of the plurality of insertion slits 350 may be provided to be smaller than a diameter of a pipe inserted through the slit.

Referring to FIG. 8, the second suction pipe 14b, the first discharge pipe 13a, and the injection pipe 73b are seated on and fixed to the first fixing member 300, and then additionally fixed by a support cable 360 that surrounds the circumference of the first fixing member 300. The support cable 360 may be seated in a fixing groove 361 formed along a circumference of the first fixing member 300. The fixing groove 361 may be formed along a circumference of the main body 310 and the first sub-body 320 protruding from the main body 310, or along a circumference of the main body 310 and the second sub-body 330 protruding from the main body 310.

Referring to FIGS. 2 to 5, the air conditioner 1 according to the embodiment of the disclosure may further include a second fixing member 400 provided to fix the second suction pipe 14b and the injection pipe 73b together. Specifically, the second fixing member 400 may be provided to fix the second suction pipe 14b and the first sub-injection pipe 73b together.

The second fixing member 400 may have a structure similar to that of the first fixing member 300. The second fixing member 400 may be provided to include a sub-body protruding in only one direction from the side surface of the main body 310 of the first fixing member 300. Specifically, the second fixing member 400 may be provided in a form in which the first sub-body 320 is excluded from the first fixing member 300. That is, the second fixing member 400 may include only a main body 310 and a second sub-body 330 protruding from the main body 310. In addition, the structure of the main hole 311, the second sub-hole 331, the plurality of cut insertion slits 350, the fixing groove 361, and the support cable 360 may be provided in the same forms as those of the first fixing member 300.

The second fixing member 400 may be provided to fix the second suction pipe 14b and the injection pipe 73b together at a position different from that of the first fixing member 300. For example, the second fixing member 400 may additionally fix the second suction pipe 14b and the injection pipe 73b together at a position higher than the position in which the first fixing member 300 is disposed. Alternatively, the second fixing member 400 may additionally fix the second suction pipe 14b and the first sub-injection pipe 73b together at a position lower than the position in which the first fixing member 300 is disposed.

As the second suction pipe 14b, the first discharge pipe 13a, and the first sub-injection pipe 73b are fixed together by the fixing member 300, that is, the first fixing member 300, and the second suction pipe 14b and the first sub-injection pipe 73b are fixed together by the second fixing member 400 at a position different from that of the first fixing member 300, thereby integrating the vibration displacements of the respective pipes, and thus improving the vibration in the compressor operating range.

The second suction pipe 14b and the first sub-injection pipe 73b may be pre-assembled by the manufacturer, and in the final manufacturing line of the air conditioner 1, the first discharge pipe 13a may be additionally inserted into the first fixing member 300 and fixed with the support cable 360, thereby improving the assimilability of the manufacturing line.

Among the first discharge pipe 13a, the second suction pipe 14b, and the first sub-injection pipe 73b, the first sub-injection pipe 73b having the smallest diameter may be provided with a relatively short length while increasing the vibration reduction effect, and thus the cost of additional components and materials for vibration improvement may be reduced.

Figure 10:
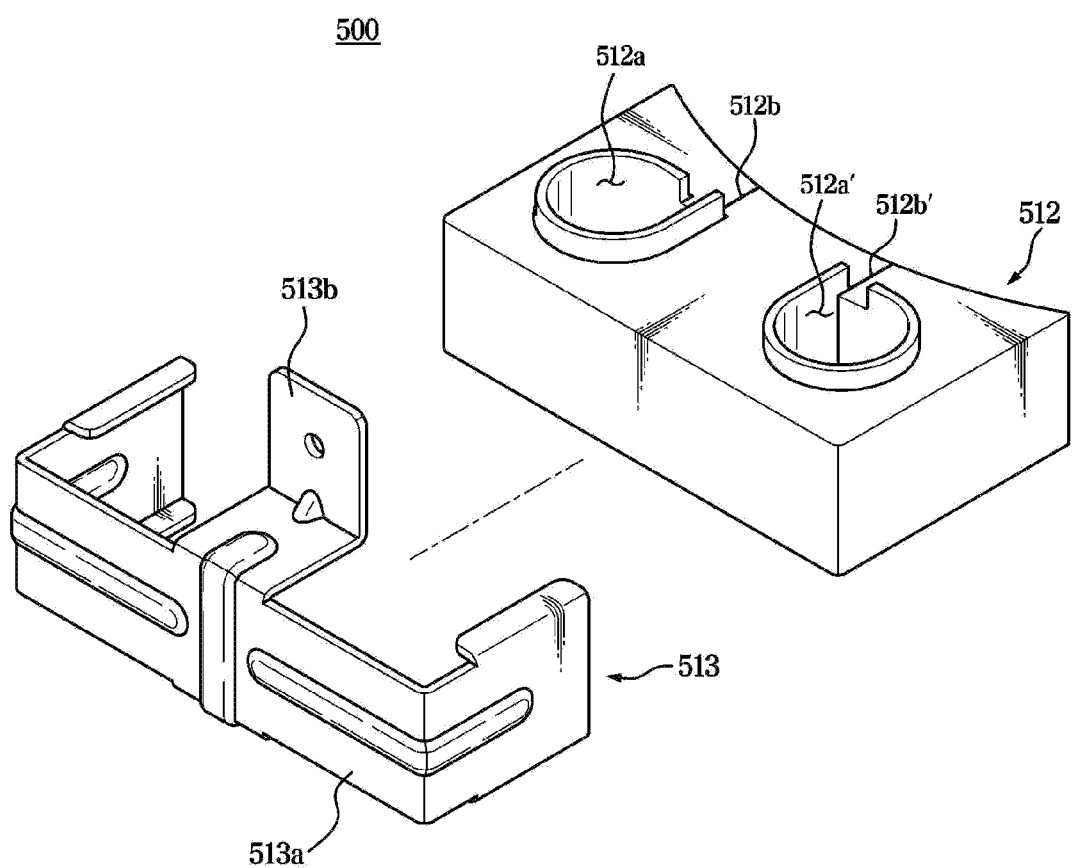
FIG. 10 is an exploded perspective view illustrating a buffer member and a buffer bracket for supporting a suction pipe applied to an air conditioner according to an embodiment of the disclosure.
Figure 11:
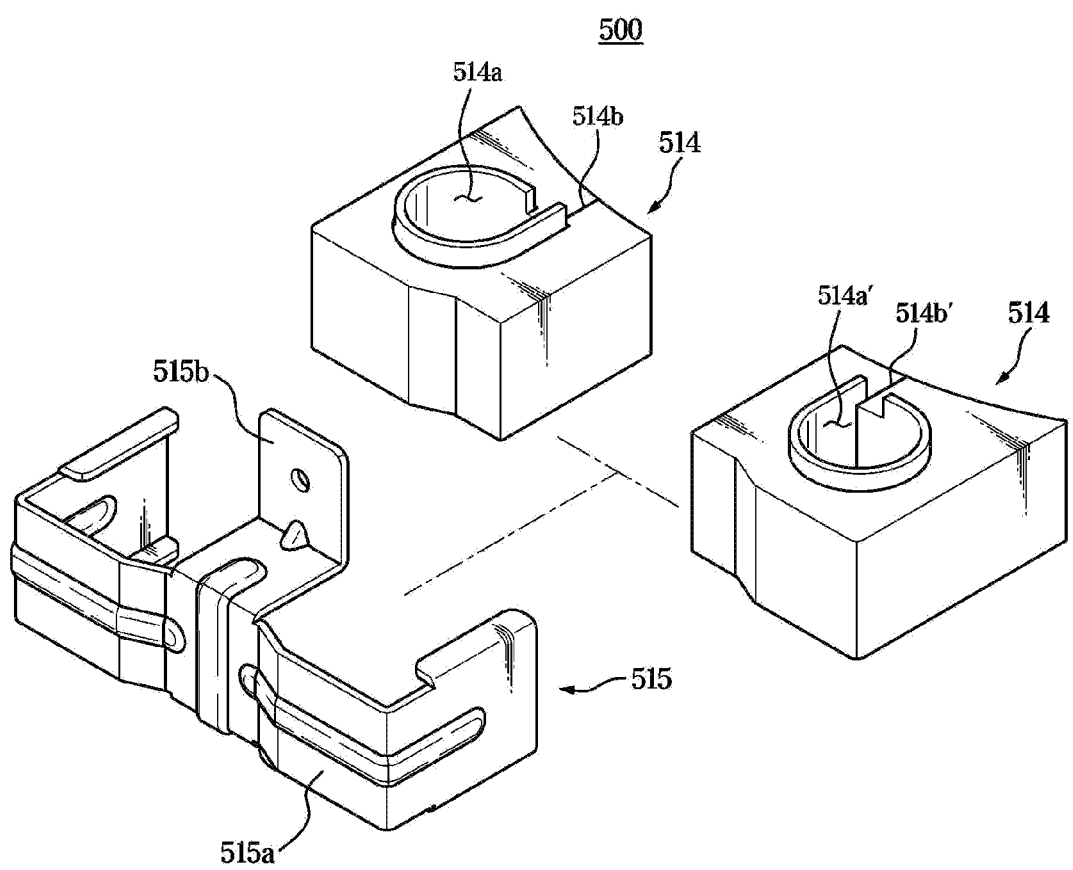
FIG. 11 is an exploded perspective view illustrating a buffer member and a buffer bracket for supporting a suction pipe applied to an air conditioner according to another embodiment of the disclosure.
Figure 12:
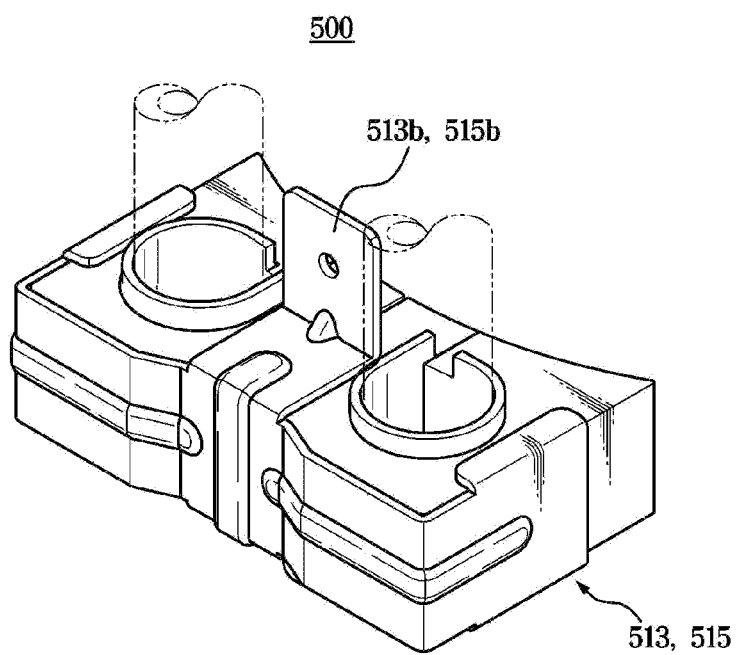
FIG. 12 is a perspective view illustrating an installation structure of a suction pipe applied to an air conditioner according to an embodiment of the disclosure.

FIG. 10 is an exploded perspective view illustrating a buffer member and a buffer bracket for supporting a suction pipe applied to an air conditioner according to an embodiment of the disclosure. FIG. 11 is an exploded perspective view illustrating a buffer member and a buffer bracket for supporting a suction pipe applied to an air conditioner according to another embodiment of the disclosure. FIG. 12 is a perspective view illustrating an installation structure of a suction pipe applied to an air conditioner according to an embodiment of the disclosure.

In the case of a conventional technology in which a common pipe for suction pipes located on a lower side of a branch pipe 540 is fixed to a side surface W of the accumulator 70, so that static vibration of the pipes may be attenuated but dynamic vibration caused by excitation of the compressor may rather be aggravated. Accordingly, there is a need for a fixing structure capable of attenuating the static vibration of the pipes while attenuating the dynamic vibration caused by the excitation of the compressor.

As shown in FIGS. 10 to 12, a part of a middle section of the suction pipe 14 may be installed on the accumulator 70 through the third fixing member 500. The third fixing member 500 may include a buffer member 512 and a buffer bracket 513 for installing the buffer member 512 to the accumulator 70.

Specifically, the second suction pipe 14b and the third suction pipe 14b' may be extended upward along the side surface W of the accumulator 70 and fixed to the side surface W of the accumulator 70 by the third fixing member 500 between the secondarily bent point X2 and the branch point Y at which the second suction pipe 14b and the third suction pipe 14b' are divided from the first suction pipe 14a into two branches. This is to prevent vibration generated in the plurality of compressors 10 from being transmitted to other components through the suction pipe 14.

The buffer member 512 is formed in a substantially quadrangular shape while having one surface formed in an arc shape to correspond to the outer surface of the accumulator 70, and includes two support holes 512a and 512a', into which the suction pipe 14, specifically, the second suction pipe 14b and the third suction pipe 14b' are respectively inserted to be supported, and two cutouts 512b and 512b' that are cut while connecting to the two support holes 512a and 512a', respectively, to allow the second suction pipe 14b and the third suction pipe 14b' to be inserted into the two support holes 512a and 512a', respectively.

The two support holes 512a and 512a' may be referred to as a first support hole 512a and a second support hole 512a', respectively. The second suction pipe 14b may be inserted into the first support hole 512a, and the third suction pipe 14b' may be inserted into the second support hole 512a'.

The buffer bracket 513 includes a support portion 513a formed in a substantially U-shape to support the outer surface of the buffer member 512, and fixing portions 513b extending from upper and lower ends of the support portion 513a and fixed to the outer circumferential surface of the accumulator 70.

In the embodiment, the buffer member 512 is formed only as one buffer member, but is not limited thereto. As shown in FIG. 11, two buffer members 514 may be provided to be installed for the second suction pipe 14b and the third suction pipe 14b', respectively.

In the embodiment, the two buffer members 514 may include a first support hole 514a and a second support hole 514a' into which the second suction pipe 14b and the third suction pipe 14b' are inserted and supported, and may include a cutout 514b and a cutout 514b' that allow the second suction pipe 14b and the third suction pipe 14b' to be inserted into the first support hole 514a and the second support hole 514a', respectively.

The buffer bracket 515 includes support portions 515a formed in a shape corresponding to the outer surfaces of the two buffer members 514 to support the outer surfaces of the two buffer members 514, and fixing portions 515b extending from an upper end and a lower end of a part, at which the support portions 515a are connected, and fixed to the outer surface of the accumulator 70.

The structure as described above may be compatibly applied to not only an air conditioning system including two compressors but also an air conditioning system including only one compressor, and used to fix one suction pipe to an accumulator through a buffer member and a buffer bracket.

In addition, since a certain part of a sub-suction pipe branched from a branch pipe 540 is surrounded using a buffer member, which is an elastic member, and the outer surface of the buffer member is fixed to the accumulator using a buffer bracket, the static vibration of the pipe may be attenuated while the dynamic vibration caused by excitation of the compressor may be reduced.

What is claimed is:

1. An air conditioner comprising:
   a compressor configured to compress a refrigerant;
   an accumulator connectable to the compressor and configured to store the refrigerant flowing from an outdoor heat exchanger or to store the refrigerant flowing from an indoor heat exchanger;
   a discharge pipe connectable to the compressor, and configured to guide from the compressor;
   a suction pipe connectable to the accumulator and configured to guide the refrigerant discharged from the accumulator to the compressor;
   a subcooler to be disposed between the outdoor heat exchanger and the indoor heat exchanger and configured to secure a degree of supercooling of the refrigerant;
   an injection pipe connectable to the subcooler to guide the refrigerant superheated in the subcooler to the compressor; and
   a fixer to fix the discharge pipe, the suction pipe, and the injection pipe together, the fixer including:
      a main body including a main hole to fix the suction pipe;
      a first sub-body having a first sub-hole to fix the discharge pipe; and
      a second sub-body having a second sub-hole to fix the injection pipe,
      wherein a portion of the first sub-body protrudes along a first direction from a first portion of a side surface of the main body,
      wherein a portion of the second sub-body protrudes along a second direction from a second portion of the side surface of the main body,
      wherein another portion of the first sub-body protrudes along the first direction from a third portion of the side surface of the main body,
      wherein another portion of the second sub-body protrudes along the second direction from the third portion of the side surface of the main body,
      wherein the first direction is perpendicular to an extending direction of the main body, and the second direction is perpendicular to the direction in which the main body extends, and wherein the first direction is perpendicular to the second direction,
      wherein the first sub-hole is axially offset from the main hole in the first direction and the second sub-hole is axially offset from the main hole in the second direction,
      wherein the first portion, the second portion and the third portion of the main body include the main hole, the portion and the another portion of the first sub-body include the first sub hole, and the portion and the another portion of the second sub-body include the second sub hole,
      wherein the first portion, the third portion and the second portion are arranged along the extending direction of the main body, and the third portion is between the first portion and the second portion along the extending direction of the main body;
      wherein the third portion is a reinforcement portion formed in an area in which a height of the first sub-body in the extending direction of the main body overlaps a height of the second sub-body in the extending direction of the main body,
      wherein the fixer further comprises:
      a fixing groove; and
      a support cable to be seated in the fixing groove to support the fixer to fix the discharge pipe, the suction pipe, and the injection pipe together.

2. The air conditioner of claim 1, wherein the fixer is a first fixer, and the air conditioner further comprises:
   at least one second fixer to fix the suction pipe and the injection pipe together at a position different from a position of the first fixer.

3. The air conditioner of claim 1, wherein the discharge pipe, the suction pipe, and the injection pipe extend in parallel with each other in an area in which the discharge pipe, the suction pipe, and the injection pipe are fixed by the fixer.

4. The air conditioner of claim 1, wherein the first-fixer further includes a plurality of insertion slits defined in the extending direction of the main body such that the suction pipe, the discharge pipe, and the injection pipe are seated in the main hole, the first sub-hole, and the second sub-hole, respectively.

5. The air conditioner of claim 1, wherein the compressor is a first compressor, the air conditioner further comprising a second compressor, wherein the suction pipe includes a first suction pipe extending from a lower end of the accumulator, and a second suction pipe and a third suction pipe divided from the first suction pipe.

6. The air conditioner of claim 1, further comprising a plurality of compressors including the compressor, the suction pipe includes a main suction pipe extending from a lower end of the accumulator as one pipe, and a plurality of sub-suction pipes divided from the main suction pipe and connected to the plurality of compressors, respectively.

7. The air conditioner of claim 1, wherein the fixing groove comprises:
   a first fixing groove formed along a circumference of the main body and a circumference of the first sub-body; and
   a second fixing groove formed along the circumference of the main body and a circumference of the second sub-body, and
   wherein the support cable is seated in the circumference of the main body and the circumference of the first sub-body and seated in the circumference of the main body and the circumference of the second sub-body, respectively, to support the fixer to fix the discharge pipe, the suction pipe, and the injection pipe together.

8. The air conditioner of claim 1, wherein the main body includes:
   an upper portion from which the first sub-body is protruded; and
   a lower portion from which the second sub-body is protruded, and
   wherein the first direction which the first sub-body is protruded from the upper portion of the main body is perpendicular to the second direction which the second sub-body is protruded from the lower portion of the main body.

9. The air conditioner of claim 5, wherein the second suction pipe and the third suction pipe individually extend in an upper direction to a lower direction along a side surface of the accumulator,
wherein the second suction pipe and the third suction pipe are bent at a position higher than an upper end of the first compressor or an upper end of the second compressor, and
wherein the second suction pipe and the third suction pipe are connected to a first suction port formed on the upper end of the first compressor and a second suction port formed on the upper end of the second compressor, respectively.

10. The air conditioner of claim 5, wherein a branch point at which the second suction pipe and the third suction pipe are divided from the first suction pipe is provided at a position spaced apart from a side surface of the accumulator.

11. The air conditioner of claim 9, comprising:
a buffer formed of an elastic material and having a first support hole and a second support hole in which the second suction pipe and the third suction pipe are inserted and supported, respectively; and
a buffer bracket fixed to the accumulator by supporting an outer surface of the buffer.

12. The air conditioner of claim 11, wherein the buffer includes a plurality of cutouts that allow the second suction pipe and the third suction pipe to be inserted into the first support hole and the second support hole, respectively.

13. An air conditioner comprising:
a compressor configured to compress a refrigerant;
an accumulator connected to the compressor and configured to store the refrigerant flowing from an outdoor heat exchanger or to store the refrigerant flowing from an indoor heat exchanger;
a discharge pipe connected to the compressor, and configured to guide refrigerant from the compressor;
a suction pipe connected to the accumulator and configured to guide the refrigerant discharged from the accumulator to the compressor;
a subcooler disposed in between the outdoor heat exchanger and the indoor heat exchanger and configured to secure a degree of supercooling of the refrigerant;
an injection pipe connected to the subcooler and configured to guide the refrigerant superheated in the subcooler to the compressor; and
a fixer to fix the discharge pipe, the suction pipe and the injection pipe together, the fixer including:
a main body including a main hole to fix the suction pipe;
a first sub-body having a first sub-hole to fix the discharge pipe, the first sub-body protruding from the main body in a first direction perpendicular to a direction in which the main body extends; and
a second sub-body having a second sub-hole to fix the injection pipe, the second sub body protruding from the main body in a second direction perpendicular to the direction in which the main body extends, wherein the first direction is perpendicular to the second direction,
wherein a portion of the first sub-body protrudes from a first portion of a side surface of the main body,
wherein a portion of the second sub-body protrudes from a second portion of the side surface of the main body,
wherein another portion of the first sub-body protrudes from a third portion of the side surface of the main body,
wherein another portion of the second sub-body protrudes from the third portion of the side surface of the main body,
wherein the first direction is perpendicular to an extending direction of the main body, and the second direction is perpendicular to the direction in which the main body extends, and wherein the first direction is perpendicular to the second direction,
wherein the first sub-hole is axially offset from the main hole in the first direction and the second sub-hole is axially offset from the main hole in the second direction,
wherein the first portion, the second portion and the third portion of the main body include the main hole, the portion and the another portion of the first sub-body include the first sub hole, and the portion and the another portion of the second sub-body include the second sub hole,
wherein the first portion, the third portion and the second portion are arranged along the extending direction of the main body, and the third portion is between the first portion and the second portion along the extending direction of the main body,
wherein the third portion is a reinforcement portion formed in an area in which a height of the first sub-body in the extending direction of the main body overlaps a height of the second sub-body in the extending direction of the main body.

14. The air conditioner of claim 13, wherein the fixer further comprises:
a fixing groove; and
a support cable to be seated in the fixing groove to support the fixer to fix the discharge pipe, the suction pipe, and the injection pipe together.

15. The air conditioner of claim 13, wherein the main body includes:
an upper portion from which the first sub-body is protruded; and
a lower portion from which the second sub-body is protruded, and wherein the first direction which the first sub-body is protruded from the upper portion of the main body is perpendicular to the second direction which the second sub-body is protruded from the lower portion of the main body.

16. The air conditioner of claim 6, comprising:
a buffer formed of an elastically deformable material and having an inside thereof with a plurality of support holes in which the plurality of sub-suction pipes are inserted and supported; and
a buffer bracket fixed to the accumulator by supporting an outer surface of the buffer.

17. The air conditioner of claim 14, wherein the fixing groove comprises:
a first fixing groove formed along a circumference of the main body and a circumference of the first sub-body; and
a second fixing groove formed along the circumference of the main body and a circumference of the second sub-body, and
wherein the support cable is seated in the circumference of the main body and the circumference of the first sub-body and seated in the circumference of the main body and the circumference of the second sub-body, respectively, to support the fixer to fix the discharge pipe, the suction pipe, and the injection pipe together.

* * * * *